US008762142B2

(12) United States Patent
Jeong et al.

(10) Patent No.: US 8,762,142 B2
(45) Date of Patent: Jun. 24, 2014

(54) MULTI-STAGE SPEECH RECOGNITION APPARATUS AND METHOD

(75) Inventors: So-young Jeong, Seoul (KR); Kwang-cheol Oh, Yongin-si (KR); Jae-hoon Jeong, Yongin-si (KR); Jeong-su Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 848 days.

(21) Appl. No.: 11/889,665

(22) Filed: Aug. 15, 2007

(65) Prior Publication Data

US 2008/0208577 A1 Aug. 28, 2008

(30) Foreign Application Priority Data

Feb. 23, 2007 (KR) ........................ 10-2007-0018666

(51) Int. Cl.
*G10L 15/02* (2006.01)
*G10L 15/16* (2006.01)
*G10L 15/32* (2013.01)

(52) U.S. Cl.
CPC ................. *G10L 15/32* (2013.01); *G10L 15/16* (2013.01); *G10L 15/02* (2013.01)
USPC ............................ 704/232; 704/202; 704/203

(58) Field of Classification Search
CPC .......... G10L 15/02; G10L 15/16; G10L 15/32
USPC .......................... 704/202, 205, 211, 231, 232
See application file for complete search history.

(56) References Cited

U.S. PATENT DOCUMENTS

| | | | | |
|---|---|---|---|---|
| 5,515,475 | A * | 5/1996 | Gupta et al. | 704/242 |
| 5,754,978 | A * | 5/1998 | Perez-Mendez et al. | 704/255 |
| 6,253,178 | B1 * | 6/2001 | Robillard et al. | 704/238 |
| 6,393,398 | B1 * | 5/2002 | Imai et al. | 704/254 |
| 6,542,866 | B1 * | 4/2003 | Jiang et al. | 704/255 |
| 7,016,835 | B2 * | 3/2006 | Eide et al. | 704/231 |
| 7,228,275 | B1 * | 6/2007 | Endo et al. | 704/235 |
| 7,340,395 | B2 * | 3/2008 | Gurram et al. | 704/231 |

OTHER PUBLICATIONS

Schwarz et al. "Towards lower error rates in phoneme recognition," Proc. TSD 2004, Brno, Czech Republic, Sep. 2004, No. ISBN 87-90834-09-7, Published by Springer-Verlag, Berlin, pp. 465-472.*
Szoke et al. "Comparison of keyword spotting approaches for informal continuous speech", Proc. Joint Workshop on Multimodal Interaction and Related Machine Learning Algorithms, 2005.*
Kirchhoff et al. "Combining acoustic and articulatory feature information for robust speech recognition", Speech Communication 37 (2002) pp. 303-319.*
Di Martino, J. et al., *On the Use of High Order Derivatives for High Performance Alphabet Recognition*, IEEE 2002, pp. I-953-I-956.

(Continued)

*Primary Examiner* — Jialong He
(74) *Attorney, Agent, or Firm* — Staas & Halsey LLP

(57) ABSTRACT

Provided are a multi-stage speech recognition apparatus and method. The multi-stage speech recognition apparatus includes a first speech recognition unit performing initial speech recognition on a feature vector, which is extracted from an input speech signal, and generating a plurality of candidate words; and a second speech recognition unit rescoring the candidate words, which are provided by the first speech recognition unit, using a temporal posterior feature vector extracted from the speech signal.

9 Claims, 8 Drawing Sheets

(56) References Cited

OTHER PUBLICATIONS

Hermansky, H. et al., *Temporal Patterns (Traps) in ASR of Noisy Speech* (4 pages) published in Proc. ICASSP 1999.
Hilger, F. et al., *Quantile Based Histogram Equalization for Noise Robust Large Vocabulary Speech Recognition, IEEE Transactions on Audio, Speech, and Language Processing*, vol. 14, No. 3, pp. 845-854, May 2006.
Hung, J. et al., *Optimization of Temporal Filters for Constructing Robust Features in Speech Recognition*, vol. 14, No. 3, pp. 808-832, May 2006.
Li, J. et al., *A Study on Knowledge Source Integration for Candidate Rescoring in Automatic Speech Recognition*, IEEE 2005, pp. I-837-I-840.
Shire, M. et al., *Data-Driven RASTA Filters in Reverberation* (4 pages), Published in Proc. ICASSP, 2000.
Pujol, P. et al., *On Real-Time Mean-and-Variance Normalization of Speech Recognition Features*, IEEE 2006, pp. I-773-I-776.
Korean Office Action issued Apr. 19, 2013 in corresponding Korean Patent Application No. 10-2007-0018666.
Petr Schwarz et al., "Hierarchical Structures of Neural Networks for Phoneme Recognition", ICASSP, 2006, pp. 325-328.
Martin Riedmiller et al., "A Direct Adaptive Method for Faster Backpropagation Learning: the RPROP Algorithm", IEEE, 1993, pp. 586-591.
Korean Office Action issued Oct. 25, 2013 in Korean Patent Application No. 10-2007-0018666.
Korean Notice of Allowance issued Mar. 31, 2014 in Korean Patent Application No. 10-2007-0018666.

* cited by examiner

MULTI-STAGE SPEECH RECOGNITION APPARATUS AND METHOD

BACKGROUND OF THE INVENTION

This application claims the priority of Korean Patent Application No. 10-2007-0018666, filed on Feb. 23, 2007, in the Korean Intellectual Property Office, the disclosure of which is incorporated herein in its entirety by reference.

1. Field of the Invention

The present invention relates to speech recognition, and more particularly, to a multi-stage speech recognition apparatus and method, which rescore a plurality of candidate words obtained from initial recognition using a temporal posterior feature vector.

2. Description of the Related Art

Currently, speech recognition technology is gradually expanding its application range from personal mobile terminals to information electronic appliances, computers, and high-capacity telephony servers. However, unstable recognition performance varying according to the surrounding environment serves as the biggest obstacle in applying speech recognition technology to a wider range of real-life products.

In order to reduce instability of speech recognition performance due to, for example, noise generated in the surrounding environment, diverse studies are being conducted on technologies for linearly or non-linearly converting conventional mel-frequency cepstral coefficient (MFCC) feature vectors in consideration of their temporal features in a speech feature vector extraction process which is the first stage of speech recognition technology.

Conventional conversion algorithms, which take into consideration temporal features of feature vectors, include cepstral mean subtraction, mean-variance normalization disclosed in "On Real-Time Mean-Variance Normalization of Speech Recognition Features," P. Pujol, D. Macho and C. Nadeu, ICASSP, 2006, pp. 773-776, a RelAtive SpecTrAl (RASTA) algorithm disclosed in "Data_Driven RASTA Filters in Reverberation," M. L. Shire et al, ICASSP, 2000, pp. 1627-1630, histogram normalization disclosed in "Quantile Based Histogram Equalization for Noise Robust Large Vocabulary Speech Recognition," F. Hilger and H. Ney, IEEE Trans. Audio, Speech, Language Processing, vol. 14, no. 3, pp. 845-854, and an augmenting delta feature disclosed in "On the Use of High Order Derivatives for High Performance Alphabet Recognition, J. di Martino, ICASSP, 2002, pp. 953-956.

Conventional technologies for linearly converting feature vectors include methods of converting feature data in temporal frames using linear discriminant analysis (LDA) and principal component analysis (PCA) disclosed in "Optimization of Temporal Filters for Constructing Robust Features in Speech Recognition," Jeih-Weih Hung et al, IEEE Trans. Audio, Speech, and Language Processing, vol. 14, No. 3, 2006, pp. 808-832.

Conventional conversion methods using non-linear neural networks include a tempoRAl patterns (TRAP) algorithm disclosed in "Temporal Patterns in MSR of Noisy Speech," H. Hermansky and S. Sharma, ICASSP, 1999, pp. 289-292, automatic speech attribute transcription (ASAT) disclosed in "A Study on Knowledge Source Integration for Candidate Rescoring in Automatic Speech Recognition," Jinyu Li, Yu Tsao and Chin-Hui Lee, ICASSP, 2005, pp. 837-840.

SUMMARY OF THE INVENTION

The present invention provides a multi-stage speech recognition apparatus and method, which rescore a plurality of candidate words obtained from initial recognition using a temporal posterior feature vector.

According to an aspect of the present invention, there is provided a multi-stage speech recognition apparatus including a first speech recognition unit performing initial speech recognition on a feature vector, which is extracted from an input speech signal, and generating a plurality of candidate words; and a second speech recognition unit rescoring the candidate words, which are provided by the first speech recognition unit, using a temporal posterior feature vector extracted from the speech signal.

According to another aspect of the present invention, there is provided a multi-stage speech recognition method including performing initial speech recognition on a feature vector, which is extracted from an input speech signal, and generating a plurality of candidate words; and rescoring the candidate words, which are obtained from the initial speech recognition, using a temporal posterior feature vector extracted from the speech signal.

According to another aspect of the present invention, there is provided a computer-readable recording medium on which a program for executing the multi-stage speech recognition method is recorded.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
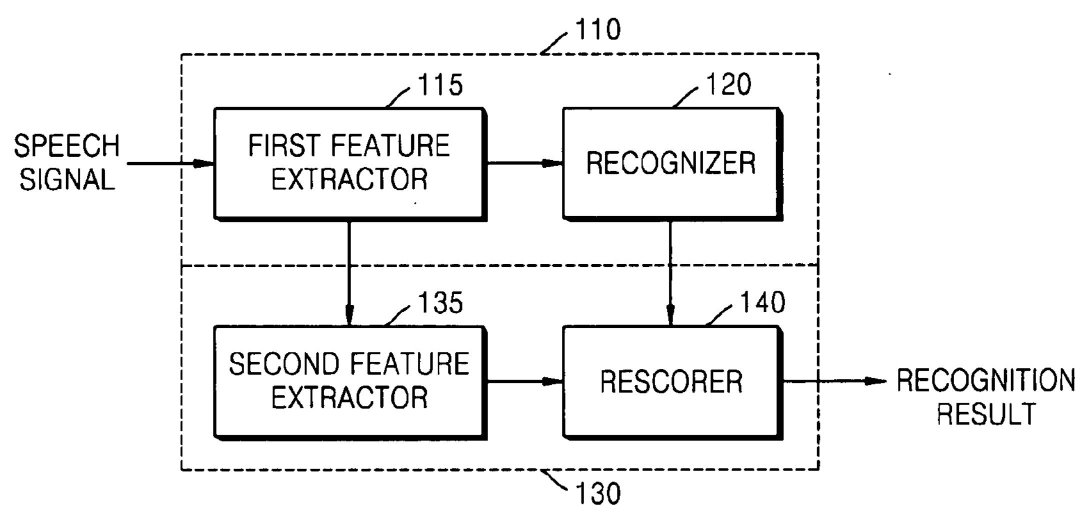
FIG. 1 is a block diagram of a multi-stage speech recognition apparatus according to an embodiment of the present invention.

FIG. 1 is a block diagram of a multi-stage speech recognition apparatus according to an embodiment of the present invention. The multi-stage speech recognition apparatus includes a first speech recognition unit 110 and a second speech recognition unit 130. The first speech recognition unit 110 includes a first feature extractor 115 and a recognizer 120.

The second speech recognition unit 130 includes a second feature extractor 135 and a rescorer 140.

Referring to FIG. 1, the first speech recognition unit 110 extracts feature vectors from an input speech signal, performs first speech recognition on the extracted feature vectors, and generates a plurality of candidate words. Specifically, the first feature extractor 115 extracts feature vectors from an input speech signal. The feature vectors are obtained by extracting components required for recognition from the speech signal and compressing the extracted components. Generally, the feature vectors have time dependent frequency information. Examples of the feature vectors extracted by the first feature extractor 115 include mel-frequency cepstral coefficients (MFCCs), linear prediction cepstral coefficients (LPCCs), and an ensemble interval histogram (EIH). In the present embodiment, MFCCs having a short-term spectrum characteristic are used as the feature vectors.

The first feature extractor 115 may perform various pre-processing processes in order to extract the feature vectors from the speech signal. A pre-processing process and a feature extraction process will now be described briefly. In the pre-processing process, a speech signal is filtered by an anti-aliasing filter, converted into a digital speech signal by an analog/digital (A/D) converter, and filtered by a digital pre-emphasis filter having a high-pass characteristic. Then, the digital speech signal is divided into a plurality of frames of predetermined size. Here, the digital speech signal may be divided into a plurality of frames in units of blocks by applying a Hamming window to the pre-emphasized signal. The Hamming window is to make up for discontinuity which may appear when the speech signal is cut in units of frames. The size of each frame is usually 20 to 30 ms and may preferably be 30 ms. The speech signal of a frame is converted into a speech signal in a frequency domain using a fast Fourier transform. Consequently, spectrum size information is obtained. The speech signal is passed through a mel-frequency filter bank, which imitates an auditory model, and thus a feature vector for each band is obtained. The shape of the mel-frequency filter bank and a method of setting a center frequency are determined in consideration of auditory characteristics of the ear, that is, frequency characteristics in a cochlea. The feature vector for each band is compressed using a log function, and discrete cosine transformation (DCT) is performed on the compressed feature vector for each band in order to reduce correlation of the feature vector for each band. Then, mean-variance transformation is performed on the DCT-transformed feature vector for each band. Consequently, an MFCC feature vector resistant to noise and channel changes is generated. The MFCC feature vector may include 12 coefficients c1 through c12 and may additionally use a frame log energy feature vector which has been separately obtained. Therefore, a 13-dimensional vector is used as an input for speech recognition.

The recognizer 120 extracts a plurality of words from the feature vector provided by the first feature extractor 115 using a probability model. An example of the probability model used by the recognizer 120 includes a hidden Markov model (HMM).

The second speech recognition unit 130 rescores the candidate words provided by the first speech recognition unit 110 using a temporal posterior feature vector and outputs a word having the highest score as the final recognition result. Specifically, the second feature extractor 135 extracts a temporal posterior feature vector from the feature vector provided by the first feature extractor 115. If the temporal posterior feature vector is used, modelling can be performed by reflecting time-varying voice characteristics. An example of the temporal posterior feature vector extracted by the second feature extractor 135 includes an automatic speech attribute transcription (ASAT) feature vector, a tempoRAI patterns (TRAP) feature vector, a split-temporal context (STC)-TRAP feature vector, or an advanced STC-TRAP feature vector. When extracting a TRAP feature vector, the second feature extractor 135 needs phonemic information which will be given as a target value of a neural network for each frame. Since the neural network is learned by using the phonemic information, posterior probabilities of phonemes can be discreetly obtained.

The rescorer 140 recalculates auditory model scores of the candidate words provided by the recognizer 120 using the extracted temporal posterior feature vector and probability model and outputs a word having the highest auditory model score as the final recognition result. An example of the probability model used by the rescorer 140 also includes an HMM.

Figure 2:
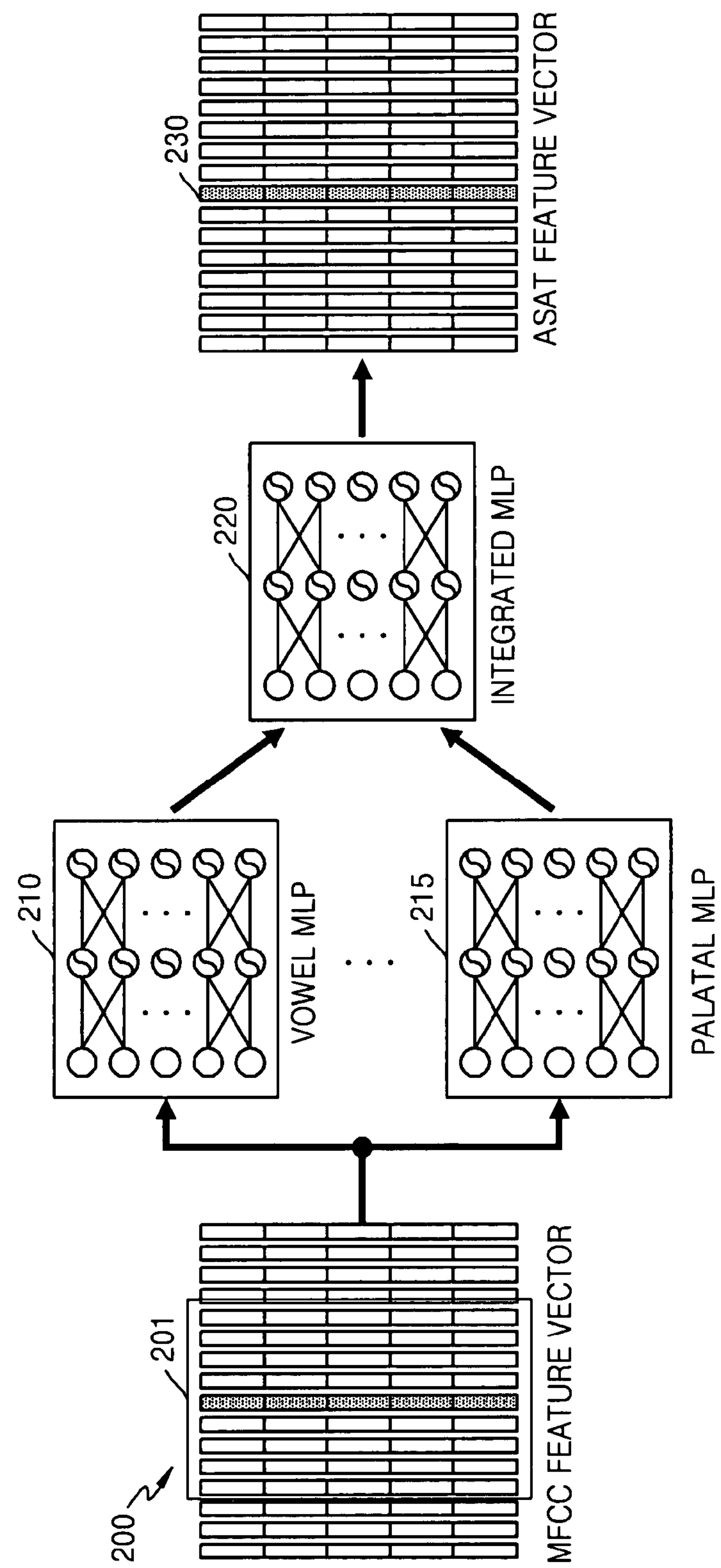
FIG. 2 is a block diagram of a second feature extractor illustrated in FIG. 1 according to a first embodiment of the present invention.

FIG. 2 is a block diagram of the second feature extractor 135 illustrated in FIG. 1 according to a first embodiment of the present invention. In the present embodiment, an ASAT feature vector 230 is used as a temporal posterior feature vector.

Referring to FIG. 2, an ASAT algorithm generates the ASAT feature vector 230 from an MFCC feature vector 200 through a multi-layer perceptron (MLP) which is two stages of non-linear neural networks. Here, the MLP is not applied to each band. Instead, feature vectors 201 of adjacent frames placed before and after a current frame, which is to be converted, are input to neural networks, and target values of MLPs 210 and 215 in the first stage are set as class information of phonemes in the current frame. That is, the phonemes are divided into 15 classes, i.e., vowel, stop, fricative, approximant, nasal, low, mid, high, dental, labial, coronal, palatal, velar, glottal, and silence. Then, a target value of each class is set. Outputs of the MLPs 210 and 215 in the first stage are input to an integrated MLP 220 in the second stage, and a target value of the integrated MLP 220 is set as a phonemic value of the current frame that is to be converted.

Figure 3:
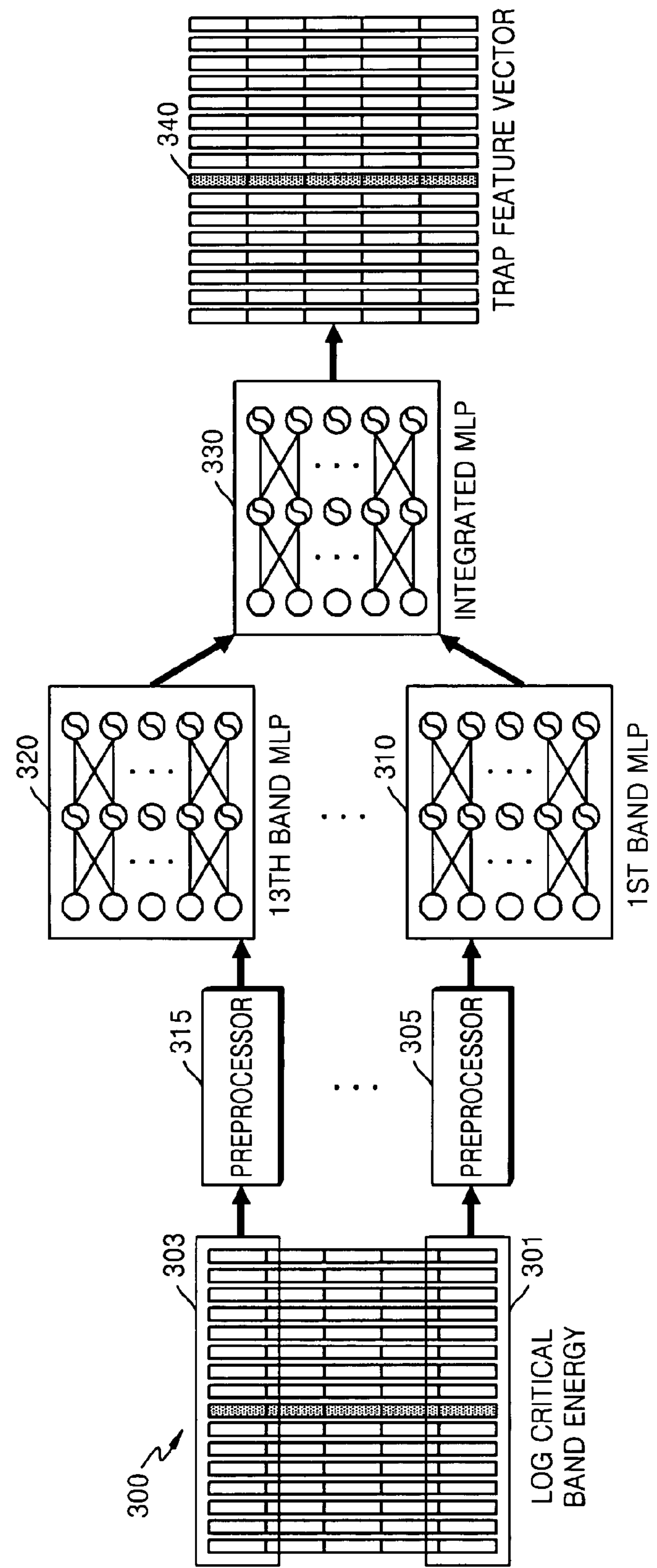
FIG. 3 is a block diagram of the second feature extractor illustrated in FIG. 1 according to a second embodiment of the present invention.

FIG. 3 is a block diagram of the second feature extractor 135 illustrated in FIG. 1 according to a second embodiment of the present invention. In the present embodiment, a TRAP feature vector 340 is used as a temporal posterior feature vector.

Referring to FIG. 3, adjacent frames placed before and after a current frame, which is to be converted, in a log critical band energy feature vector 300 extracted from a speech signal are provided to pre-processors 305 and 315 for respective bands 301 and 303. Outputs of the pre-processors 305 and 306 are converted into the TRAP feature vector 340 via non-linear networks, that is, MLPs 310 and 320 for the respective bands 301 and 303, and an integrated MLP 330. Here, target values of the MLPs 310 and 320 are given as phonemic classes of the current frame that is to be converted. For example, if 39 phonemes are recognized, a target value of an output neuron, which has a phonemic class corresponding to the current frame, from among output neurons of the MPLs 310 and 320 for the respective bands 301 and 303 is set to one, and target values of the remaining output neurons are set to zero. Each of the MLPs 310 and 320 has 39 output values, which are input to the integrated MLP 330. Like the target values of the MLPs 310 and 320, a target value of the integrated MLP 330 is also set using phonemic class information of the current frame that is to be converted. The TRAP feature vector 340 thus obtained better reflects correlation between relatively longer frames, that is, temporal correlation, than an MFCC feature vector.

Figure 4:
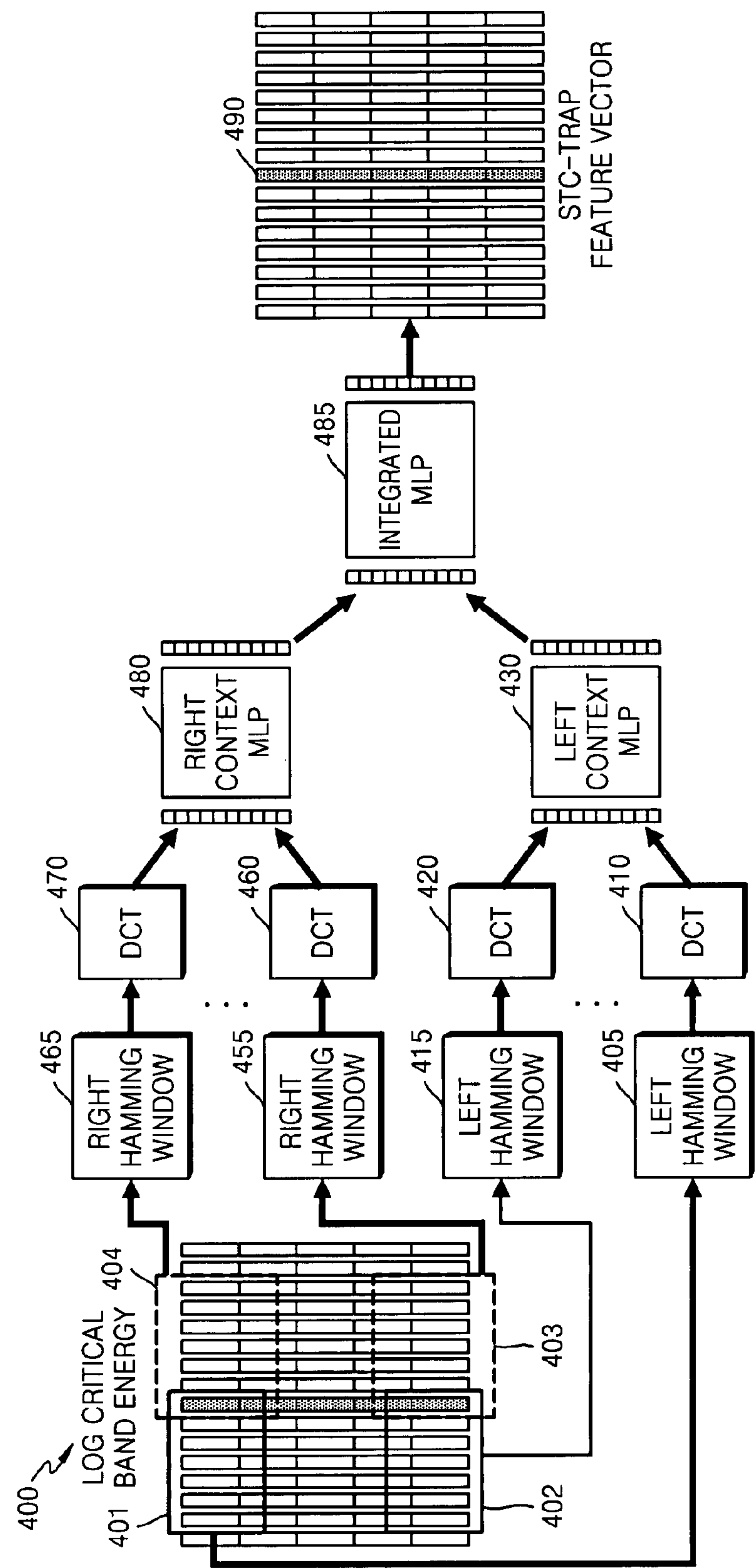
FIG. 4 is a block diagram of the second feature extractor illustrated in FIG. 1 according to a third embodiment of the present invention.

FIG. 4 is a block diagram of the second feature extractor 135 illustrated in FIG. 1 according to a third embodiment of the present invention. In the present embodiment, an STC-TRAP feature vector 490 is used as a temporal posterior feature vector.

Referring to FIG. 4, the STC-TRAP feature vector 490 is designed to more efficiently model the correlation between feature vectors for respective bands despite a band-independent neural network. Feature vectors 401 through 404 of adjacent frames corresponding to contexts before and after a feature vector of a current frame, which is to be converted, in a log critical band energy feature vector 400 extracted from a speech signal respectively pass through Hamming windows 405, 415, 455 and 465 for respective bands. The feature vectors 401 through 404 of the adjacent frames corresponding to the contexts before and after the feature vector of the current frame, which is to be converted, are divided into two blocks based on the feature vector of the current frame. Then, data is compressed by DCTs 410, 420, 460 and 470 for respective bands. The compressed data of the adjacent frames placed before the current frame, which is to be converted, is provided to a left context MLP 430, and the compressed data of the adjacent frames placed after the current frame is provided to a right context MLP 480. Here, target values of the left context MLP 430 and the right context MLP 480 are given as phonemic classes of the current frame. For example, if 39 phonemes are recognized, a target value of an output neuron, which has a phonemic class corresponding to the current frame, from among output neurons of the left and right context MLPs 430 and 480 is set to one, and target values of the remaining output neurons are set to zero. Each of the left and right context MLPs 430 and 480 has 39 output values, which are input to an integrated MLP 485. Like the target values of the left and right context MLPs 430 and 480, a target value of the integrated MLP 485 is also set using phonemic class information of the current frame that is to be converted. Finally, the integrated MLP 485 integrates the feature vectors of the adjacent frames placed before and after the current frame and generates the STC-TRAP feature vector 490 having a temporal posterior probability.

Figure 5:
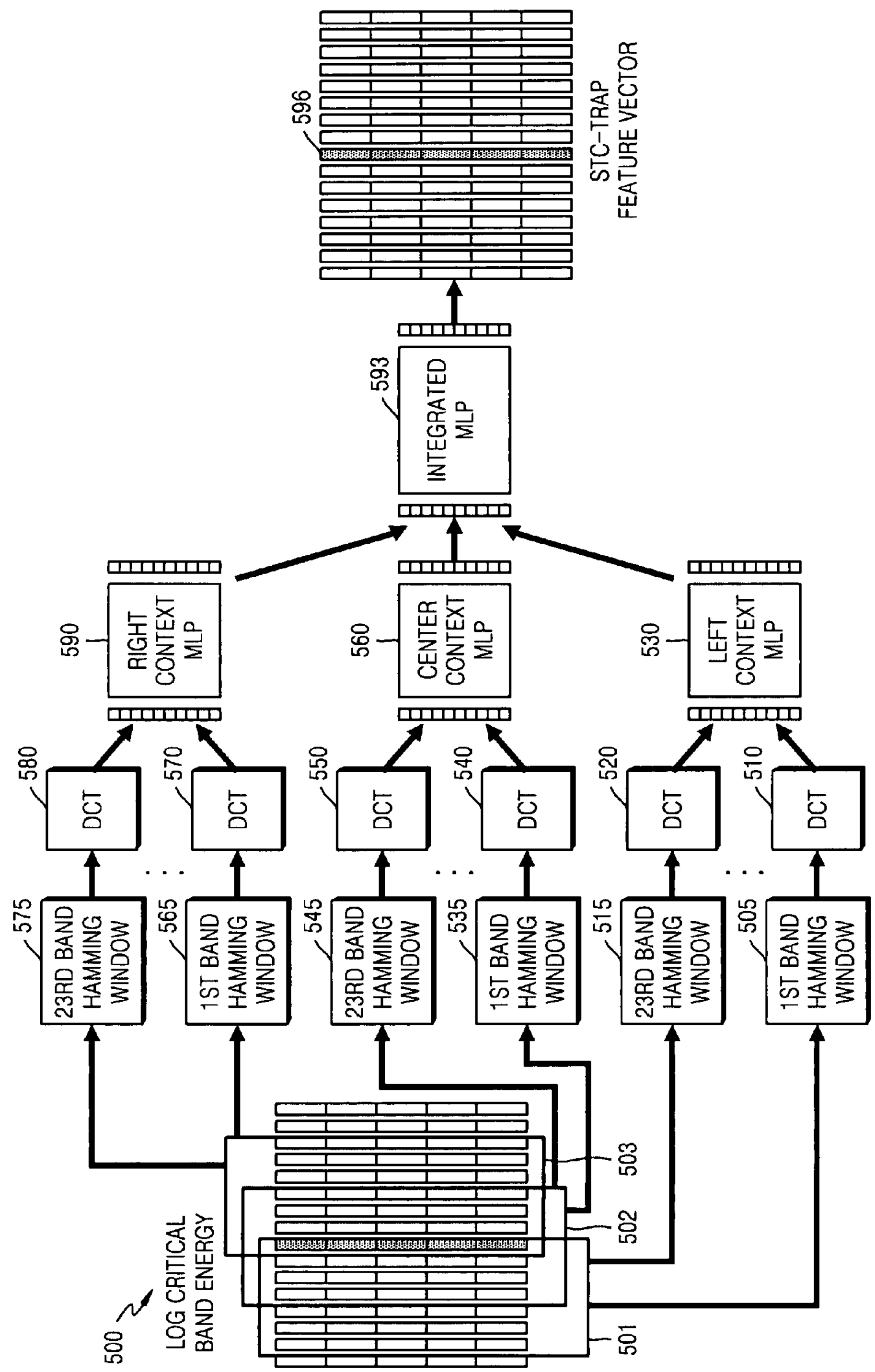
FIG. 5 is a block diagram of the second feature extractor illustrated in FIG. 1 according to a fourth embodiment of the present invention.

FIG. 5 is a block diagram of the second feature extractor 135 illustrated in FIG. 1 according to a fourth embodiment of the present invention. In the present embodiment, an advanced STC-TRAP feature vector 596 is used as a temporal posterior feature vector. The second feature extractor 135 illustrated in FIG. 5 further includes a center context MLP 560 compared with the second feature extractor 135 illustrated in FIG. 4.

Referring to FIG. 5, feature vectors 501 through 503 of adjacent frames corresponding to contexts before and after a feature vector of a current frame, which is to be converted, in a log critical band energy feature vector 500 extracted from a speech signal respectively pass through Hamming windows 505, 515, 535, 565 and 575 for respective bands. The feature vectors 501 through 503 of the adjacent frames corresponding to the contexts before and after the feature vector of the current frame, which is to be converted, are divided into three blocks based on the feature vector of the current frame. Then, data is compressed by DCTs 510, 520, 540, 550, 570 and 580 for respective bands. The compressed data of the adjacent frames placed before the current frame, which is to be converted, is provided to a left context MLP 530, the compressed data of the adjacent frames placed before and after the current frame is provided to the center context MLP 560, and the compressed data of the adjacent frames placed after the current frame is provided to a right context MLP 590. Here, target values of the left context MLP 530, the center context MLP 560, and the right context MLP 590 are given as phonemic classes of the current frame. Each of the left, center and right context MLPs 530, 560 and 590 has 39 output values, which are input to an integrated MLP 593. Like the target values of the left, center and right context MLPs 530, 560 and 590, a target value of the integrated MLP 593 is also set using phonemic class information of the current frame that is to be converted. Finally, the integrated MLP 593 integrates the feature vectors of the adjacent frames placed before and after the current frame and generates the STC-TRAP feature vector 596 having a temporal posterior probability.

Figure 6A:
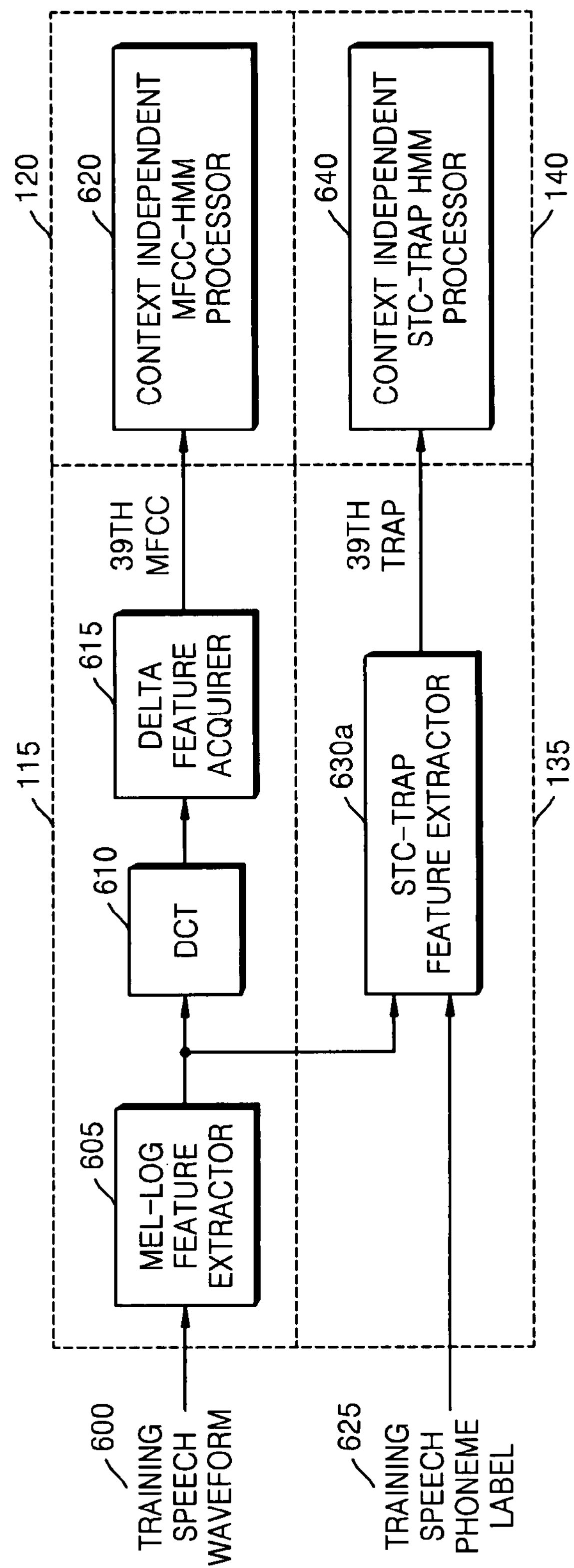
FIGS. 6A and 6B are diagrams for explaining a process of processing a training speech signal.
Figure 6B:
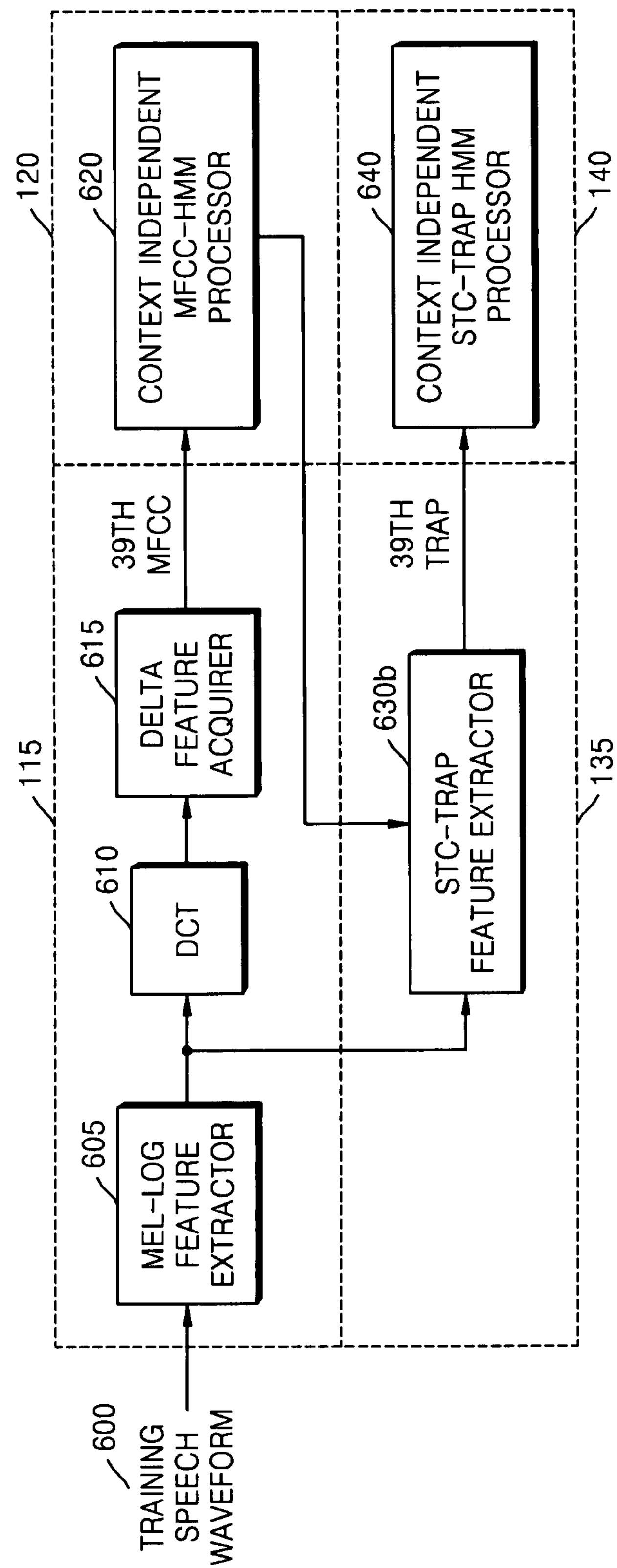

FIGS. 6A and 6B are diagrams for explaining a process of processing a training speech signal. Specifically, FIG. 6A is a diagram for explaining a process of processing a training speech signal when a training database (DB) (not shown) includes label information of phonemes, and FIG. 6B is a diagram for explaining a process of processing a training speech signal when a training DB (not shown) does not include label information of phonemes. A mel-log feature extractor 604, a DCT 610, and a delta feature acquirer 614 illustrated in FIGS. 6A and 6B correspond to the first feature extractor 115 illustrated in FIG. 1, and a context-independent MFCC-HMM processor 620 illustrated in FIGS. 6A and 6B corresponds to the recognizer 120 illustrated in FIG. 1. In addition, an STC-TRAP feature extractor 630*a* or 630*b* illustrated in FIG. 6A or 6B corresponds to the second feature extractor 135 illustrated in FIG. 1, and a context-independent STC-TRAP HMM processor 640 illustrated in FIGS. 6A and 6B corresponds to the rescorer 140 illustrated in FIG. 1. That is, if the training DB stores the label information of the phonemes, the STC-TRAP feature extractor 630*a* uses the label information of the phonemes stored in the training DB. If the training DB does not store the label information of the phonemes, the STC-TRAP feature extractor 630*b* uses label information of phonemes obtained by the context-independent MFCC-HMM processor 630. In the present embodiment illustrated in FIGS. 6A and 6B, the advanced STC-TRAP feature vector 596 illustrated in FIG. 5 is used as an example of a temporal posterior feature vector.

Referring to FIGS. 6A and 6B, the mel-log feature extractor 605 receives a training speech waveform 600, extracts an MFCC feature vector from the received training speech waveform 600, and provides the extracted MFCC feature vector to the DTC 610 and the STC-TRAP feature extractor 630*a* or 630*b*. Since the operations of the DTC 610, the delta feature acquirer 615 and the context-independent MFCC-HMM processor 620, and learning processes of the context-independent MFCC-HMM processor 620 and a context-independent STC-TRAP HMM processor 640 are well known in the art, a detailed description thereof will be omitted. The STC-TRAP feature extractor 630 is configured as illustrated in FIG. 5, the left context MLP 530, the center context MLP 560, the right context MLP 590 and the integrated MLP 593 learn parameters using a backpropagation method. The backpropagation method may be an error backpropagation method or a resilient backpropagation method.

The error backpropagation method is a supervised learning algorithm used in a multi-layer feedforward neural network. That is, the error backpropagation method requires input data and desired output data for learning. The concept of learning will now be briefly explained, if an input is repeatedly multiplied by weights of a neural network and then added several times, an output, which is a resultant value of the input, is produced. However, the output is different from a desired output given in learning data. Consequently, an error occurs in the neural network, and a weight of an output layer is updated in proportion to the error. Accordingly, a weight of a hidden layer is updated. A direction in which weights are updated is different from a direction in which the neural network is processed, which is why this algorithm is called backpropagation algorithm. In other words, the neural network is processed in a direction from an input layer to the hidden layer and the output layer, and the weights are updated in a direction from the output layer to the input layer.

The resilient backpropagation method is useful for solving encoder-decoder problems such as those of an auto-associative neural network. In addition, the resilient backpropagation method shows fast convergence and learning speed. A learning equation of the resilient backpropagation method is defined by Equation (1).

$$E(w[n]) = \frac{1}{2}\sum_{i}\sum_{s}(t_i^s - y_i^s(w[n]))^2 \quad (1)$$

$$w_{ij}[n] = w_{ij}[n-1] + \Delta w_{ij}[n].$$

Here, an error function is defined by a mean-squared error of neurons of the output layer, and a weight learning algorithm is defined. Meanwhile, weights are updated by Equations (2) and (3).

$$\Delta w_{ij}[n] = \begin{cases} -\Delta_{ij}[n], \text{ if } \dfrac{\partial E(w[n])}{\partial w_{ij}} > 0 \\ +\Delta_{ij}[n], \text{ if } \dfrac{\partial E(w[n])}{\partial w_{ij}} < 0 \\ 0, \text{ otherwise,} \end{cases} \quad (2)$$

$$\Delta_{ij}[n] = \begin{cases} \eta^{+}\Delta_{ij}[n], \text{ if } \dfrac{\partial E(w[n-1])}{\partial w_{ij}} \cdot \dfrac{\partial E(w[n])}{\partial w_{ij}} > 0 \\ \eta^{-}\Delta_{ij}[n], \text{ if } \dfrac{\partial E(w[n-1])}{\partial w_{ij}} \cdot \dfrac{\partial E(w[n])}{\partial w_{ij}} < 0 \\ \Delta_{ij}[n-1], \text{ otherwise.} \end{cases} \quad (3)$$

Unlike the error propagation method, which updates weights by multiplying partial differential values of the weights for an error by learning rates, the resilient backpropagation method updates the weights to values in consideration of a current partial differential value and a partial differential value of a previous iteration. Equation (3) satisfies $0<\eta^{-}<1<\eta^{+}$.

Figure 7:
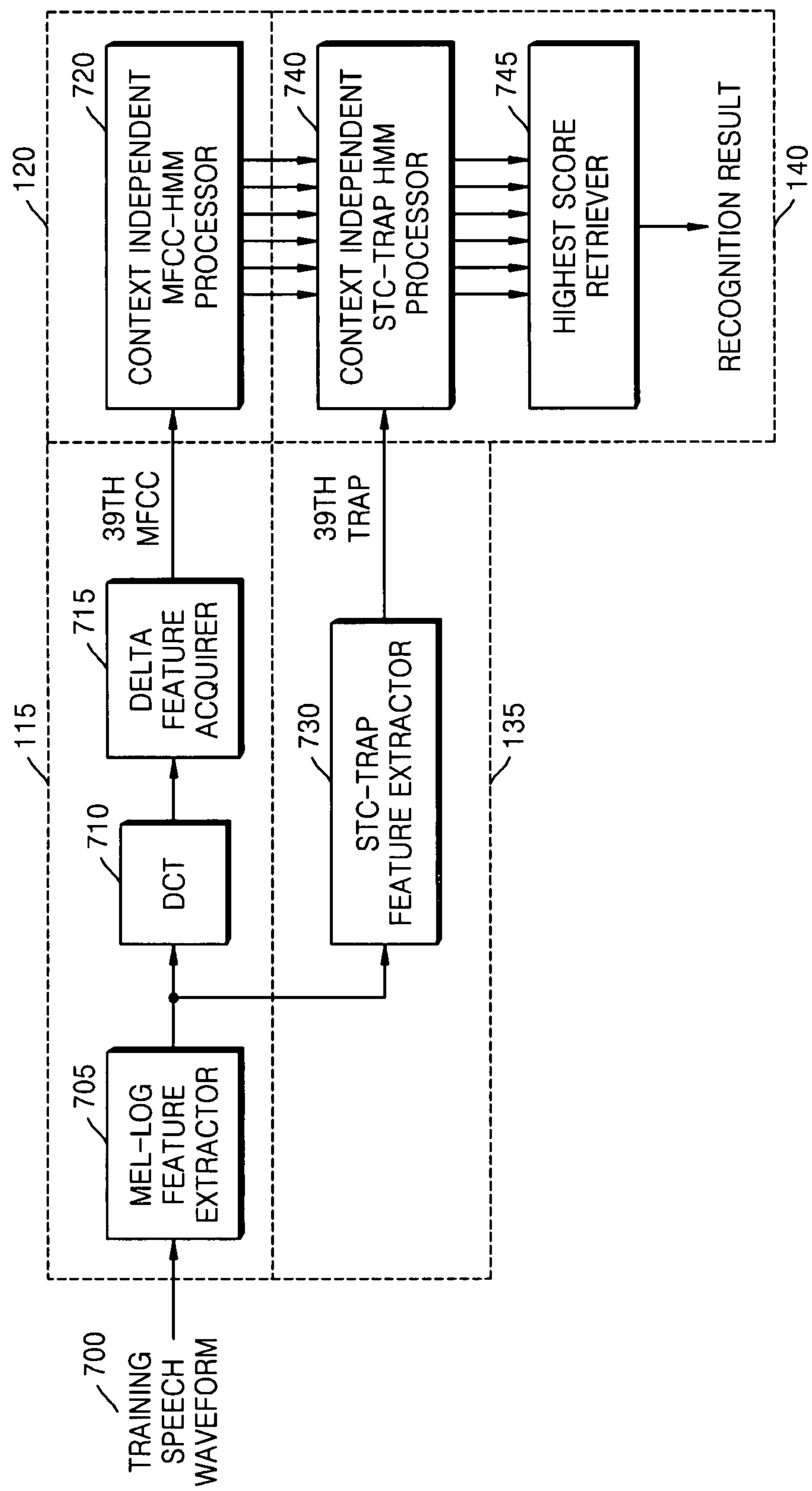
FIG. 7 is a diagram for explaining a process of processing a test speech signal.

FIG. 7 is a diagram for explaining a process of processing a test speech signal. A mel-log feature extractor 705, a DCT 710, and a delta feature acquirer 715 illustrated in FIG. 7 together correspond to the first feature extractor 115 illustrated in FIG. 1, and a context-independent MFCC-HMM processor 720 illustrated in FIG. 7 corresponds to the recognizer 120 illustrated in FIG. 1. In addition, an STC-TRAP feature extractor 730 illustrated in FIG. 7 corresponds to the second feature extractor 135 illustrated in FIG. 1, and a context-independent STC-TRAP HMM processor 740 and a highest score retriever 745 illustrated in FIG. 7 corresponds to the rescorer 140 illustrated in FIG. 1. Parameters respectively used by the context-independent MFCC-HMM processor 720, the STC-TRAP feature extractor 730, and the context-independent STC-TRAP HMM processor 740 are learned in advance with reference to FIGS. 6A and 6B.

Referring to FIG. 7, the mel-log feature extractor 705 receives a test speech waveform 700, extracts an MFCC feature vector from the received test speech waveform 700, and provides the extracted MFCC feature vector to the DTC 710 and the STC-TRAP feature extractor 730. The DTC 710 and the STC-TRAP feature extractor 730 generate a $39^{th}$ MFCC feature vector used for initial recognition from the MFCC feature vector and provide the generated $39^{th}$ MFCC feature vector to the context independent MFCC-HMM processor 720. The context independent MFCC-HMM processor 720 has already been learned and outputs N best candidate words using the $39^{th}$ MFCC feature vector. The STC-TRAP feature extractor 730 extracts an STC-TRAP feature vector from the MFCC feature vector, which is output from the meal-log feature extractor 705, and provides the extracted STC-TRAP feature vector to the context independent STC-TRAP HMM processor 740. The context independent STC-TRAP HMM processor 740 performs forced alignment of the N best candidate words provided by the context independent MFCC-HMM processor using the extracted STC-TRAP feature vector and recalculates the score of the STC-TRAP HMM auditory model. A highest score retriever 745 searches for a candidate word having the highest score based on the calculation result of the context independent STC-TRAP HMM processor 740 and outputs the found candidate word as the final recognition result.

Table 1 below shows recognition performance achieved when a multi-stage speech recognition method according to the present invention was used. A TIMIT DB used in this experiment is a DB for recognizing English phonemes. In the experiment, 3,696 training sentences and 192 test sentences were used. In addition, context independent left-right HMMs were used, and a model, in which each phoneme has three states and each state has 16 mixtures, was used. English phonemes, which are to be recognized, are a set of 39 phonemes provided from a Carnegie Melon University (CMU) DB. In N best candidate sentences, N indicates 100. Referring to Table 1, when the ASAT algorithm was used, an N-best range was 66.43% at a recognition rate of 59.48% obtained from initial recognition. This is a maximum value that can be obtained from rescoring. Relative improvement may be given by Equation 4.

Relative improvement (%)=(recognition rate through rescoring−initial recognition rate)/(N-best range−initial recognition rate) (4)

If the relative improvement is used as a performance yardstick, ASAT-based rescoring can achieve a 23.7% improvement in recognition rate.

Similarly, STC-TRAP-based rescoring can achieve a 24.0% improvement in recognition rate, and advanced STC-TRAP-based rescoring can achieve a 29.0% improvement in recognition rate.

TABLE 1

| | ASAT | STC-TRAP | Advanced STC-TRAP |
|---|---|---|---|
| Initial recognition | 59.48% | 67.57% | 67.57% |
| N-best range | 66.43% | 74.27% | 74.27% |
| Rescoring | 61.13% | 69.19% | 69.51% |
| Relative improvement | 23.7% | 24.0% | 29.0% |

The multi-stage speech recognition method according to the present invention includes a computer-readable medium. The computer-readable medium stores program commands that are operable in various computers. The computer-readable medium can store program commands, data files, and data structures, or combining those. The program command of the medium is specially designed and configured, or is notified to those skilled in the art for use. The computer-readable recording medium includes a magnetic media (such as a hard disk, a floppy disk, and magnetic tape), an optical media (such as CD-ROM and DVD), a magneto-optical media (such as floptical disk), and also ROM, RAM, and flash memory. Moreover, the computer-readable recording medium includes a hardware device for storing and performing the program commands. The medium can be a transmission medium such as light, metal line, and a waveguide pipe including carrier that transmits a signal indicating program commands and data structures. The program commands can be a machine language code by a compiler and a high-level programming language code by an interpreter, which can be executable in the computer.

As described above, the present invention performs rescores a plurality of candidate words, which are obtained from initial recognition, using a temporal posterior feature vector, thereby significantly improving recognition performance.

In addition, neural network processing center context information is added to neural networks processing left context information and right context information of a current frame in order to obtain an STC-TRAP feature vector, i.e., a temporal posterior feature vector. Therefore, since information omission from the current frame can be prevented, recognition performance can be significantly enhanced.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A multi-stage speech recognition apparatus comprising: at least one processor that executes:

a first speech recognition unit performing initial speech recognition on a feature vector, which is extracted from an input speech signal, and generating a plurality of candidate words; and a second speech recognition unit rescoring the candidate words, which are provided by the first speech recognition unit, using a temporal posterior feature vector reflected from time-varying voice characteristics and extracted from the feature vector, and outputting a word having a highest score as a final recognition result;

wherein the temporal posterior feature vector is a split-temporal context (STC)-TRAP feature vector comprising a left, center, and right context part.

2. The apparatus of claim 1, wherein the first speech recognition unit comprises:

a first feature extractor extracting a spectrum feature vector from the speech signal; and a recognizer performing the initial speech recognition using the spectrum feature vector.

3. The apparatus of claim 1, wherein the second speech recognition unit comprises:

a second feature extractor extracting the temporal posterior feature vector from the feature vector; and a rescorer performing forced alignment of the candidate words, which are provided by the first speech recognition unit, using the temporal posterior feature vector.

4. The apparatus of claim 1, wherein the split-temporal context (STC)-TRAP feature vector is obtained by inputting feature vectors of adjacent frames placed before and after a current frame, which is to be converted, to a left context neural network, a center context neural network, and a right context neural network, for respective bands, and integrating outputs of the left context neural network, the center context neural network, and the right context neural network.

5. A multi-stage speech recognition method comprising:

performing, by at least one processor, initial speech recognition on a feature vector, which is extracted from an input speech signal, and generating a plurality of candidate words; and rescoring, by the at least one processor, the candidate words, which are obtained from the initial speech recognition, using a temporal posterior feature vector reflected from time- varying voice characteristics and extracted from the speech signal, and outputting a word having a highest score as a final recognition result;

wherein the temporal posterior feature vector is a split-temporal context (STC)-TRAP feature vector comprising a left, center, and right context part.

6. The method of claim 5, wherein the performing of the initial speech recognition comprises:

extracting a spectrum feature vector from the speech signal; and performing the initial speech recognition using the spectrum feature vector.

7. The method of claim 5, wherein the rescoring of the candidate words comprises:

extracting the temporal posterior feature vector from the feature vector; and performing forced alignment of the candidate words, which are obtained from the initial speech recognition, using the temporal posterior feature vector.

8. The method of claim 5, wherein the split-temporal context (STC)-TRAP feature vector is obtained by inputting feature vectors of adjacent frames placed before and after a current frame, which is to be converted, to a left context neural network, a center context neural network, and a right context neural network, for respective bands, and integrating outputs of the left context neural network, the center context neural network, and the right context neural network.

9. A non-transitory computer-readable recording medium storing a program to control at least one processing element to implement the method of claim 5.

* * * * *